United States Patent

Fujiki et al.

[19]
[11] Patent Number: 4,739,440
[45] Date of Patent: Apr. 19, 1988

[54] PACKAGING CONSTRUCTION OF A PLURALITY OF FEEDTHROUGH CAPACITORS

[75] Inventors: Yasuo Fujiki; Takeshi Tanabe; Hiromichi Sakai, all of Nagaokakyo, Japan

[73] Assignee: Murata Manufacturing Co., Ltd., Japan

[21] Appl. No.: 47,023

[22] Filed: May 6, 1987

[30] Foreign Application Priority Data

May 8, 1986 [JP] Japan .............................. 61-69480[U]

[51] Int. Cl.⁴ ........................... H01G 4/38; H05K 5/06
[52] U.S. Cl. ................................. 361/329; 174/52 FP
[58] Field of Search .................. 206/328–331, 206/334; 339/17 CF; 361/321, 328–330, 433; 174/52 FP, 51

[56] References Cited

U.S. PATENT DOCUMENTS

| | | | |
|---|---|---|---|
| 3,602,846 | 8/1971 | Hauser | 174/52 FP X |
| 3,697,818 | 10/1972 | Boursin | 174/52 FP X |
| 4,139,726 | 2/1979 | Penrod et al. | 174/52 FP |
| 4,356,529 | 10/1982 | Kopel | 361/321 X |

*Primary Examiner*—Donald A. Griffin
*Attorney, Agent, or Firm*—Ostrolenk, Faber, Gerb & Soffen

[57] ABSTRACT

A plurality of feedthrough capacitor chips are received in a single casing and retained therein in such a manner that the first outer terminals thereof are connected in common to a single earth plate formed of an electrically conductive member and installed in the casing. The lower end edge of the earth plate is exposed out of the bottom surface of the casing. On the other hand, the second outer electrodes of the feedthrough capacitor chips are respectively connected to terminals which extend to the outside of the casing.

15 Claims, 8 Drawing Sheets

PACKAGING CONSTRUCTION OF A PLURALITY OF FEEDTHROUGH CAPACITORS

BACKGROUND OF THE INVENTION

1. Field of the Invention

This invention relates to a multi-circuit feedthrough capacitor assembly designed so that a plurality of circuits each containing a feedthrough capacitor can be handled as a single part.

2. Description of the Prior Art

Figure 11:
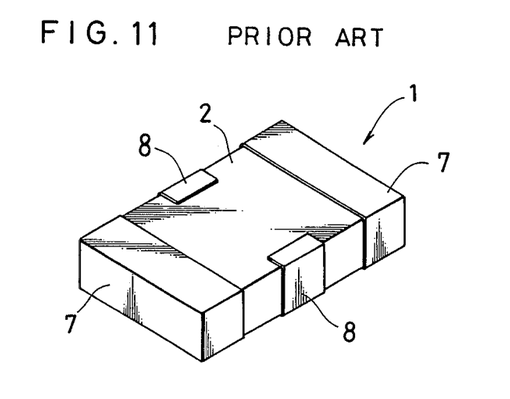
FIGS. 11 through 13 are views for explaining the arrangement of a conventional feedthrough capacitor chip 1.

Heretofore, various kinds of feedthrough capacitors have been proposed, including those which can be handled as chip parts, such as a feedthrough capacitor chip 1 shown in FIG. 11.

Figure 12:
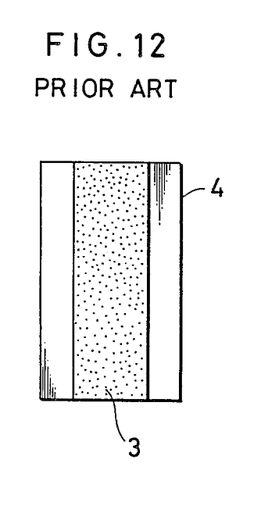
Figure 13:
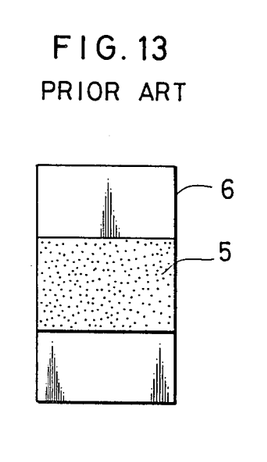

The feedthrough capacitor chip 1 has main body 2 constructed as a laminate, for example, of dielectric ceramic layers. The main body 2 comprises a portion in which ceramic layers 4 each having an inner electrode 3, as shown in FIG. 12, longitudinally extending thereacross and ceramic layers 6 each having an inner electrode 5, as shown in FIG. 13, transversely extending thereacross are alternately laminated.

The main body 2, as shown in FIG. 11, is formed with outer electrodes 7 at opposite ends thereof, and outer electrodes 8 at opposite lateral sides thereof. The outer electrodes 7 are electrically connected to the inner electrodes 3 at opposite end surfaces of the main body 2, while the outer electrodes 8 are electrically connected to the inner electrodes 5 at opposite lateral surfaces of the main body 2. These outer electrodes 7 and 8 extend to the lower surface of the main body 2, though not shown in FIG. 11.

It has been common practice to mount such feedthrough capacitor chips 1 one by one on a printed circuit board. Therefore, in a circuit which requires a number of feedthrough capacitors, a number of feedthrough capacitor chips 1 are required and hence time and labor involved in mounting and soldering them increase, leading to a rise in cost.

Figure 14:
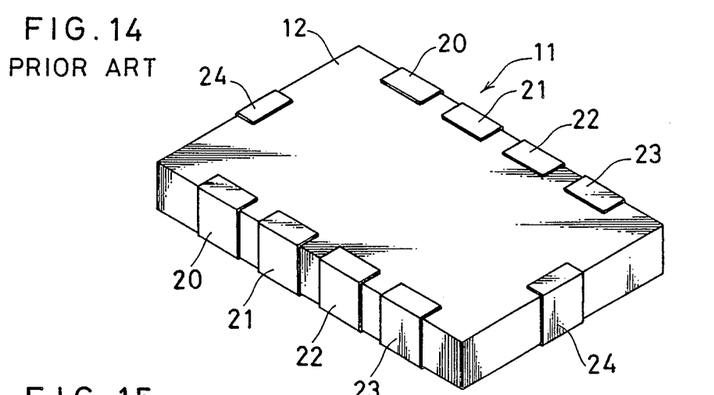
FIGS. 14 through 16 are views for explaining the arrangement of a conventional multi-circuit feedthrough capacitor chip 11.
Figure 15:
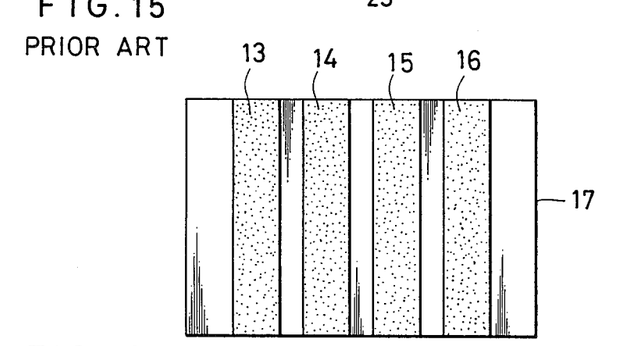
Figure 16:
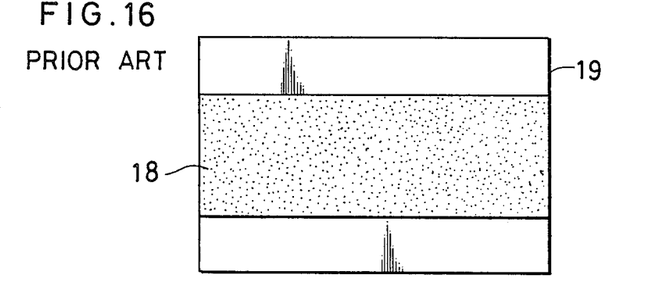

To eliminate the drawback described above, a multi-circuit feedthrough capacitor chip 11 shown in FIG. 14 has been proposed. This multi-circuit feedthrough capacitor chip 11 has also a main body 12 in the form of a laminate of dielectric ceramic layers. Present in the main body 12 are ceramic layers 17 each having a plurality of band-like inner electrodes 13 through 16 vertically extending thereacross, as shown in FIG. 15, and ceramic layers 19 each having a single inner electrode 18 horizontally extending thereacross, as shown in FIG. 16, said ceramic layers 17 and 19 being alternately laminated.

The outer surface of the main body 12 is formed with outer electrodes 20 through 24 respectively in pairs. The outer electrodes 20 are electrically connected to the inner electrodes 13, the outer electrodes 21 to the inner electrodes 14, the outer electrodes 22 to the inner electrodes 15, the outer electrodes 23 to the inner electrodes 16, and the outer electrodes 24 to the inner electrodes 18. The outer electrodes 20 through 24 extend to the lower surface of the main body 12, though not appearing in the figure.

Such multi-circuit feedthrough capacitor chip 11 can provide a circuit including four feedthrough capacitors each formed between one of the inner electrodes 13 through 16 and the inner electrode 18.

Therefore, such multi-circuit capacitor chip 11 is advantageous in that despite having a plurality of feedthrough capacitors, it can be used as a single part.

However, the conventional feedthrough capacitor chip 11 has a disadvantage that the nearer to the middle of the main body 12 is the circuit positioned, the more the inductance that is produced in the inner electrode 18 connected to the earth line and the less the insertion loss that is produced. For the same reason, there has been a problem that crosstalk is produced in relatively large amounts.

Further, since the multi-circuit feedthrough capacitor chip 11 has its main body 12 exposed, it is liable to be influenced by environmental conditions including humidity; thus, there has been a drawback that it is lacking in reliability.

Further, each time the number of circuits requiring feedthrough capacitors or circuit conditions are changed, it is necessary to prepare a feedthrough capacitor chip of different design. This is extremely disadvantageous from the standpoint of production cost particularly where demands are varied.

SUMMARY OF THE INVENTION

Accordingly, this invention is intended to provide a multi-circuit capacitor assembly which, while retaining the advantage of being capable of being handled as a single part, has superior characteristics concerning insertion loss and crosstalk and which is hardly influenced by environmental conditions including humidity and whose design can be easily changed.

To solve the problems described above, a multi-circuit feedthrough capacitor assembly according to the invention is constructed in the following manner.

A plurality of feedthrough capacitor chips are received in casing means and held therein in such a manner that the first outer electrodes of the feedthrough capacitor chips are connected in common to earth means comprising an electrically conductive member built in said casing means, with one end of said earth means being exposed out of the outer surface of the casing, while the second outer electrodes of the feedthrough capacitor chips are respectively connected to terminal means having portions thereof installed on the outside of the casing.

In this invention, the individual feedthrough capacitor chips have their outer electrodes on the earth side directly connected to the earth means and are connected to an earth line through said earth means. Therefore, little inductance is produced, the insertion loss characteristics of all feedthrough capacitor chips are superior and occurrence of crosstalk is prevented.

Further, since the feedthrough capacitor chips are housed in the casing means, they are less liable to be influenced by environmental conditions including humidity and are high in reliability.

Since a plurality of feedthrough capacitor chips are housed in such single casing means to form a plurality of circuits, high-density packaging is possible as compared with feedthrough capacitor chips 1 as shown in FIG. 11 which are individually packaged, with respect to individual circuits. Further, in mounting or soldering the multi-circuit feedthrough capacitor chip of the invention, it is possible to handle it as a single part; thus, packaging efficiency is increased and hence cost reduction can be attained.

Further, since feedthrough capacitor chips, which are used inside the casing means, are feedthrough capacitors in chip form, while the size of such feedthrough capacitors is small, the casing means itself can be made small in size.

Even when it is desired to change the number of circuits requiring feedthrough capacitors or circuit conditions, such change can be easily accommodated by simply changing the number of feedthrough capacitor chips or their type. For example, feedthrough capacitors different in capacitance from each other can be installed on the earth means in any desired order and then housed in the casing means.

DESCRIPTION OF THE PREFERRED EMBODIMENTS

Figure 1:
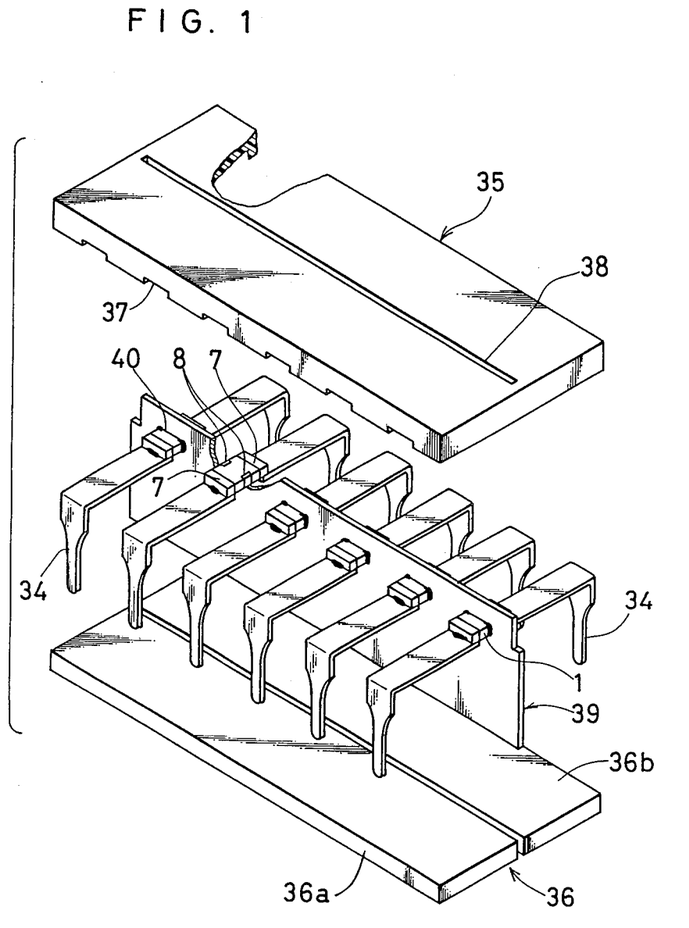
FIG. 1 is an exploded perspective view of a first embodiment of the invention.
Figure 2:
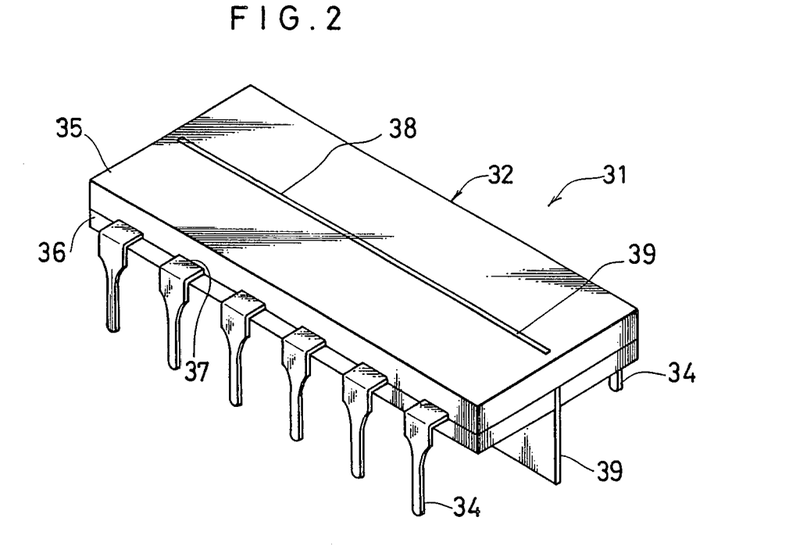
FIG. 2 is a perspective view showing the assembled state of the multi-circuit feedthrough capacitor assembly of FIG. 1.
Figure 3:
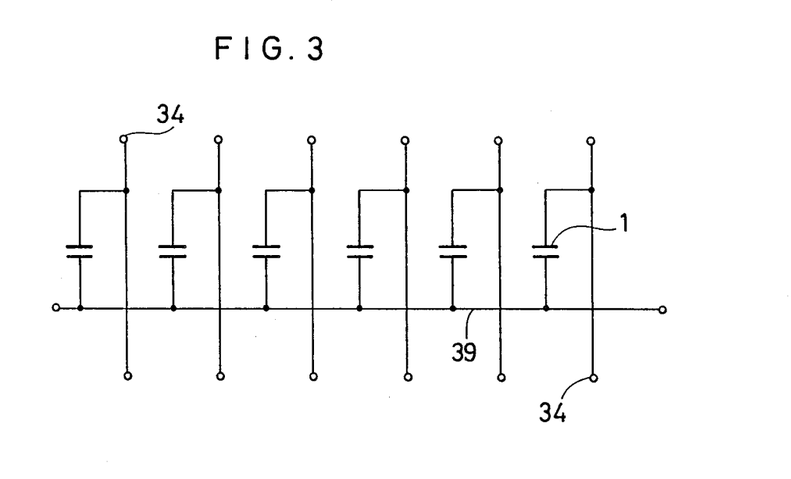
FIG. 3 is a diagram showing an equivalent circuit for the multi-circuit feedthrough capacitor assembly of FIG. 1.

FIGS. 1 through 3 show a first embodiment of the invention. This embodiment has an equivalent circuit as shown in FIG. 3 and is disassembled as shown in FIG. 1 and assembled as shown in FIG. 2.

As shown in FIG. 2, a multi-circuit feedthrough capacitor assembly 31 has a casing 32, through which a plurality of terminals 34 are led out. These terminals 34 are terminals on the hot side. A single earth plate 39 in the form of an electrically conductive member such as a metal plate is exposed out of the bottom surface of the casing 32 and projects downward therefrom. The earth plate 39 per se is a terminal on the earth side.

The casing 32, as shown in FIG. 1, is composed of a cap 35 and a base plate 36, the latter being divided into base plate halves 36a and 36b. The cap 35 and base plate 36 are made, e.g., of resin or ceramic material.

The cap 35, as appearing in the partly broken portion shown in FIG. 1, is formed on its lower surface with a recess. Opposite lateral walls of the cap 35 are preferably formed with notches 37 for receiving the horizontal portions of said terminals 34. The upper surface wall of the cap 35 is formed with a slit 38 for receiving the upper end of the earth plate 39 described above.

The earth plate 39 has holding portions 40 in the form of holes for individually receiving six feedthrough capacitor chips 1. Each feedthrough capacitor chip 1 is substantially the same as the one shown in FIG. 11. The feedthrough capacitor chips 1 respectively received in the holding portions 40 have their first outer electrodes 8 connected in common, as by soldering, to the earth plate 39. Such electrical connection also mechanically holds the feedthrough capacitor chips 1 with respect to the earth plate 39. The second outer electrodes 7 of the feedthrough capacitor chips 1 are respectively connected, as by soldering, to the associated terminals 34 on the hot side.

When the elements shown exploded in FIG. 1 are assembled, the base plate halves 36a and 36b constituting the base plate 36 are brought into contact with the lower surfaces of the horizontal portions of the terminals 34 while holding the earth plate 39 therebetween. Then, the cap 35 is placed from above onto the base plate 36 so that its notches 37 receive the horizontal portions of the terminals 34 while its slit 38 receives the upper end edge of the earth plate 39. When the cap 35 is joined to the base plate 36 as by an adhesive agent, the multi-circuit feedthrough capacitor assembly 31 shown in FIG. 2 is obtained.

Such multi-circuit feedthrough capacitor assembly 31 has an equivalent circuit as shown in FIG. 3. In FIG. 3, to clarify relationship of correspondence to the mechanical construction shown in FIGS. 1 and 2, reference characters used for the elements shown in FIGS. 1 and 2 are applied to the corresponding elements.

Figure 4:
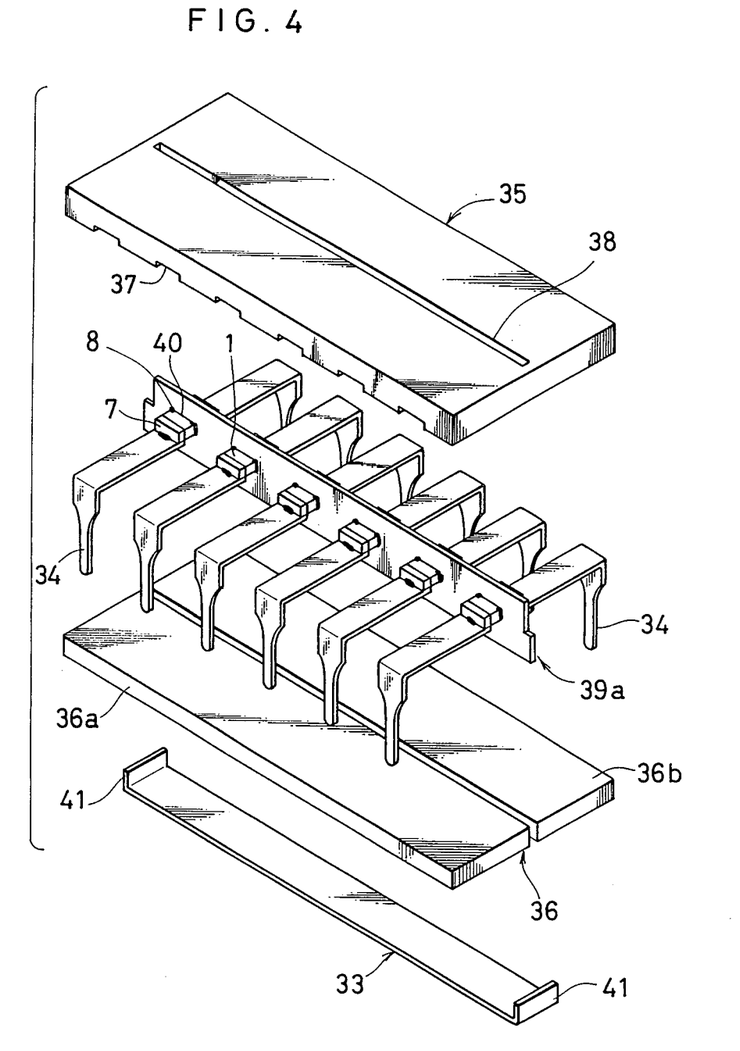
FIG. 4 is an exploded perspective view showing a second embodiment of the invention.
Figure 5:
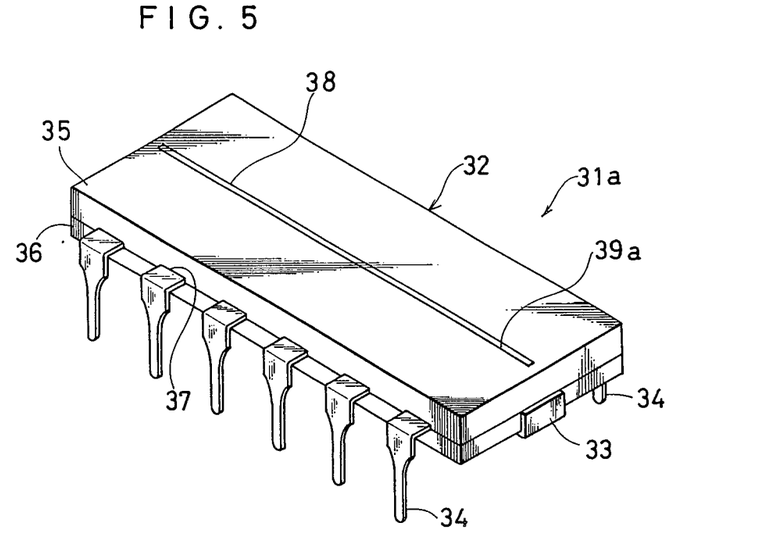
FIG. 5 is a perspective view showing the assembled state of the multi-circuit feedthrough capacitor assembly of FIG. 4.

FIGS. 4 and 5 show a second embodiment of the invention. FIGS. 4 and 5 correspond generally to FIGS. 1 and 2, respectively, but there are certain differences.

This embodiment differs from the first embodiment shown in FIG. 1 in the construction associated with the terminals on the earth side. That is, as can be seen in FIG. 5, the multi-circuit feedthrough capacitor assembly 31a, which is a finished product, has a terminal plate 33 on the earth side, separate from an earth plate 39a.

The terminal plate 33, formed of a metal plate, is provided along the lower surface of the base plate 36. The general shape of the terminal plate 33 is best shown in FIG. 4. It is formed at opposite ends thereof with upright bends 41. These upright bends 41 contact opposite end surfaces of the base plate 36.

This second embodiment has its earth plate 39a made shorter in vertical dimension than the earth plate 39 in the first embodiment. The reason is that the terminal plate 33 is provided along the lower surface of the base plate 36; when the parts are assembled as shown in FIG. 5, it is sufficient for the lower end edge of the earth plate 39a to be exposed out of the bottom surface of the casing 32, there being no need for it to project beyond said bottom surface. When the parts are in the assembled state, the terminal plate 33 is electrically and mechanically fixed to the earth plate 39a as by soldering.

The rest of the arrangement of the second embodiment is substantially the same as in the first embodiment; therefore, like reference numerals are applied to like parts and a description thereof is omitted.

In the first and second embodiments described above, when the multi-circuit feedthrough capacitor assembly 31 or 31a is packaged and used, those terminals 34 which are connected to one of the two outer terminals 7 serve as the input side and those connected to the other serve as the output side. Thus, since the earth plate 39 or 39a in these embodiments is positioned to separate the input and output sides from each other, it performs a shielding function.

Figure 6:
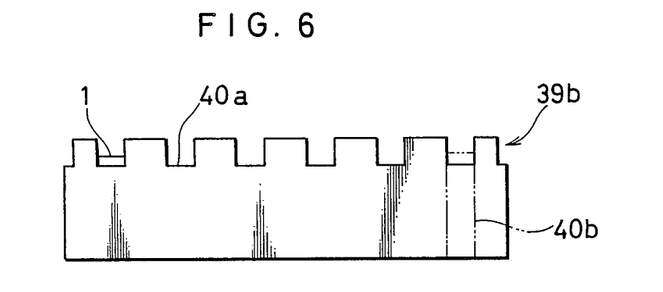
FIG. 6 is a view showing modifications of an earth plate.

FIG. 6 is a view for explaining modifications of the earth plate. These modifications, which are applicable to both of said first and second embodiments, are shown having dimensions, for purposes of convenience which are appropriate for applying the modifications to the first embodiment.

The earth plate 39b shown in FIG. 6 has holding portions 40a for holding the feedthrough capacitor chips 1, said holding portions being defined by upwardly opened notches. Even when such holding portions 40a are used, the function of positioning and holding the feedthrough capacitor chips 1 remains the same as when said holding portions 40 defined by holes are used. Rather, with such holding portions 40a defined by notches, it becomes easier to mount the feedthrough capacitor chips 1 on the holding portions 40a. This is because it is only necessary to insert the feedthrough capacitor chips 1 from above the holding portions 40a.

In addition, holding portions 40b may be formed in the manner shown by phantom lines at the right-hand end of the earth plate 39. That is, these holding portions 40b are defined by downwardly opened notches.

Further, the earth plate may be formed with holding portions, not shown, for not positively locating the feedthrough capacitor chip 1 at a particular position. That is, without forming holding portions by holes or notches, the feedthrough capacitor chips 1 may be directly attached to the earth plate by soldering them along the upper end edge of the earth plate.

FIGS. 7 through 10 show modifications of terminals led out of the casing. These modifications, which are applicable to both of the first and second embodiments described above, will be described with reference to its characteristic arrangement for the sake of convenience by applying reference numerals used in the first embodiment for the corresponding parts.

Figure 7:
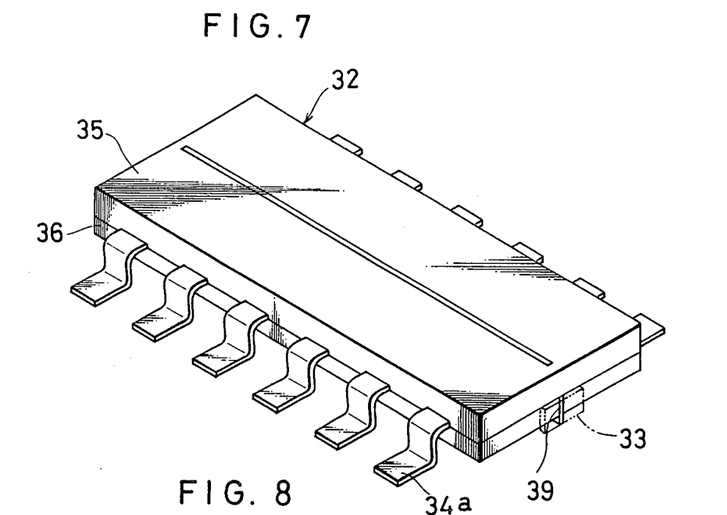
FIGS. 7, 8, 9 and 10 are perspective views of multi-circuit feedthrough capacitor assemblies, showing modifications of terminals.

The terminals 34a shown in FIG. 7, at their portions led out of the casing 32, form end portions extending away from the casing 32. The end portions of the terminals 34a form surfaces extending parallel to the lower surface of the casing 32. In addition, it is desirable that the lower end edge of the earth plate 39 be positioned flush with the lower surfaces of the end portions of the terminals 34a.

Figure 8:
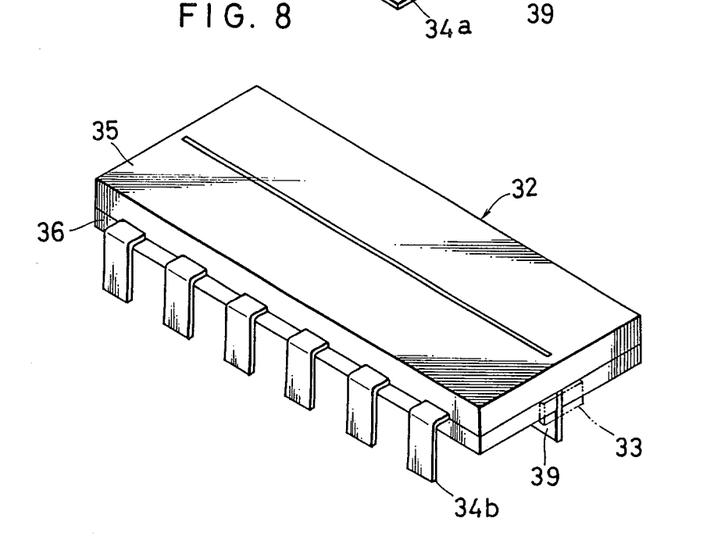

The terminals 34b shown in FIG. 8 are led out of the casing 32 with a substantially uniform width and then extend downward. In this example also, it is desirable that the lower end edge of the earth plate 39 be positioned flush with the end portions of the terminals 34b.

Figure 9:
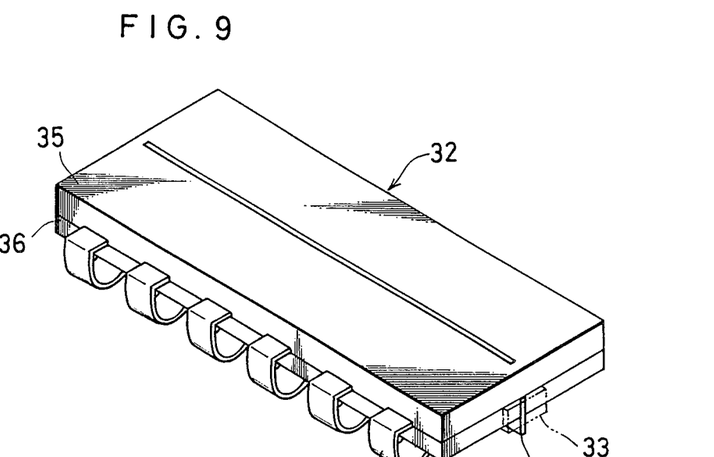

The terminals 34c shown in FIG. 9, at their portions led out of the casing 32, are curved to approach the lower surface of the casing 32. It is desirable that the lower end of the earth plate 39 be set flush with the lower surfaces of the end portions of the terminals 34c.

In FIGS. 7 through 9, the terminal plate 33 on the earth side used in the second embodiment is shown in phantom lines. This means that when the embodiments shown in FIGS. 7 through 9 are combined with the second embodiment, respectively, such terminal plate 33 is provided. In this case, of course, the earth plate 39 is positioned so that its lower end edge does not project beyond the bottom surface of the casing 32.

Figure 10:
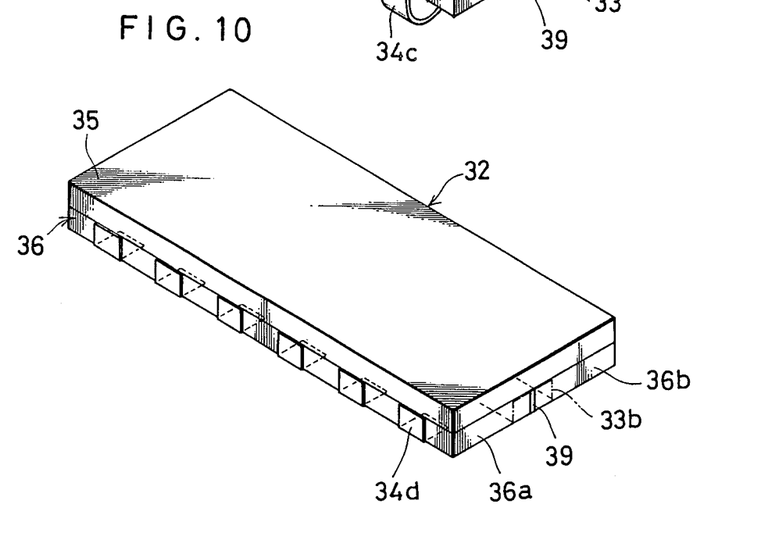

The terminals 34d shown in FIG. 10 are composed of metal films formed, for example, by printing. Therefore, these terminals 34d extend to the upper surface of the base plate 36 and are connected to the outer electrodes 7 of the feedthrough capacitor chips 1, in a manner not shown. In addition, in the case where the terminals 34d shown in FIG. 10 are applied to the second embodiment, it is desirable that a terminal 33b on the earth side corresponding to the terminal plate 33 on the earth side be composed of a metal film formed as by printing, as shown in phantom lines. It is preferable that the terminal 33b on the earth side be formed that it extends to the lateral surface of the base plate halves 36a and 36b constituting the base plate 36 in order to ensure its firm connection to the earth plate 39.

The invention has so far been described with reference to some embodiments thereof, it being noted that the number of feedthrough capacitor chips 1 included in the multi-circuit feedthrough capacitor assembly is optional and that, therefore, the number of terminals on the hot side can be correspondingly changed.

In the embodiments illustrated, the base plate 36 is composed of base plate halves 36a and 36b separated from each other, but it may, of course, be formed of a single plate member. In that case, a slit would be formed in the base plate to allow the earth plate to be exposed out of the lower surface of the base plate, i.e., the bottom surface of the casing.

Although embodiments of the present invention have been described and illustrated in detail, it is clearly understood that the same is by way of illustration and example only and is not to be taken by way of limitation, the scope of the present invention being limited only by the terms of the appended claims.

What is claimed is:

1. A feedthrough capacitor assembly comprising:
   a plurality of feedthrough capacitor chips each having first and second opposed inner electrodes and first and second outer electrodes respectively electrically connected to said first and second inner electrodes,
   casing means having space for housing said plurality of feedthrough capacitor chips and having an outer surface,
   conductive earth means having an inner portion thereof installed in said casing means and having an outer portion thereof exposed out of the outer surface of said casing means, said inner portion of said earth menas having holding portions on which said feedthrough capacitor chips are mounted, and being conductively connected to said first outer electrodes of said feedthrough capacitor chips, and
   a plurality of conductive outer terminal means each having a portion thereof positioned outside said casing means, each said outer terminal means being electrically connected to one of said second outer electrodes of said feedthrough capacitor chips, respectively.

2. A feedthrough capacitor assembly as set forth in claim 1, wherein said feedthrough capacitor chips are each in the form of a rectangular parallelepiped having a longitudinal dimension, said first outer electrodes being each formed in the lengthwise intermediate portion of said rectangular parallelepiped, said second outer electrodes being formed at lengthwise opposite ends of said rectangular parallelepiped.

3. A feedthrough capacitor assembly as set forth in claim 2, wherein said earth means is substantially flat and plate-like and said holding portions thereof are connected to the lengthwise intermediate portions of said feedthrough capacitor chips.

4. A feedthrough capacitor assembly as set forth in claim 3, wherein said outer electrode means are disposed on opposite sides of said earth means.

5. A feedthrough capacitor assembly as set forth in claim 4, wherein said holding portions of said earth means comprise holes formed in said earth means for receiving said feedthrough capacitor chips.

6. A feedthrough capacitor assembly as set forth in claim 4, wherein said holding portions of said earth means comprise notches formed in said earth means for receiving said feedthrough capacitor chips.

7. A feedthrough capacitor assembly as set forth in claim 1, wherein said earth means comprises a flat plate.

8. A feedthrough capacitor assembly as set forth in claim 1, wherein said earth means comprises a flat plate and earth terminal means connected to said flat plate and positioned on said outer surface of said casing means.

9. A feedthrough capacitor assembly as set forth in claim 8, wherein said earth terminal means comprises a plate-like member.

10. A feedthrough capacitor assembly as set forth in claim 8, wherein said earth terminal means comprises a metal film.

11. A feedthrough capacitor assembly as set forth in claim 1, wherein said outer terminal means comprises a metal plate.

12. A feedthrough capacitor assembly as set forth in claim 1, wherein said outer terminal means comprises a metal film.

13. A feedthrough capacitor assembly as set forth in claim 1, wherein said casing means includes means for locating said earth means.

14. A feedthrough capacitor assesmbly as set forth in claim 1, wherein said casing means includes means for locating said outer terminal means.

15. A feedthrough capacitor assembly as set forth in claim 1, wherein said casing means comprises a cap and a base plate which are assembled to define said space.

* * * * *